(No Model.)
S. J. DAY.
TROUGH FOR POULTRY.
No. 466,397. Patented Jan. 5, 1892.
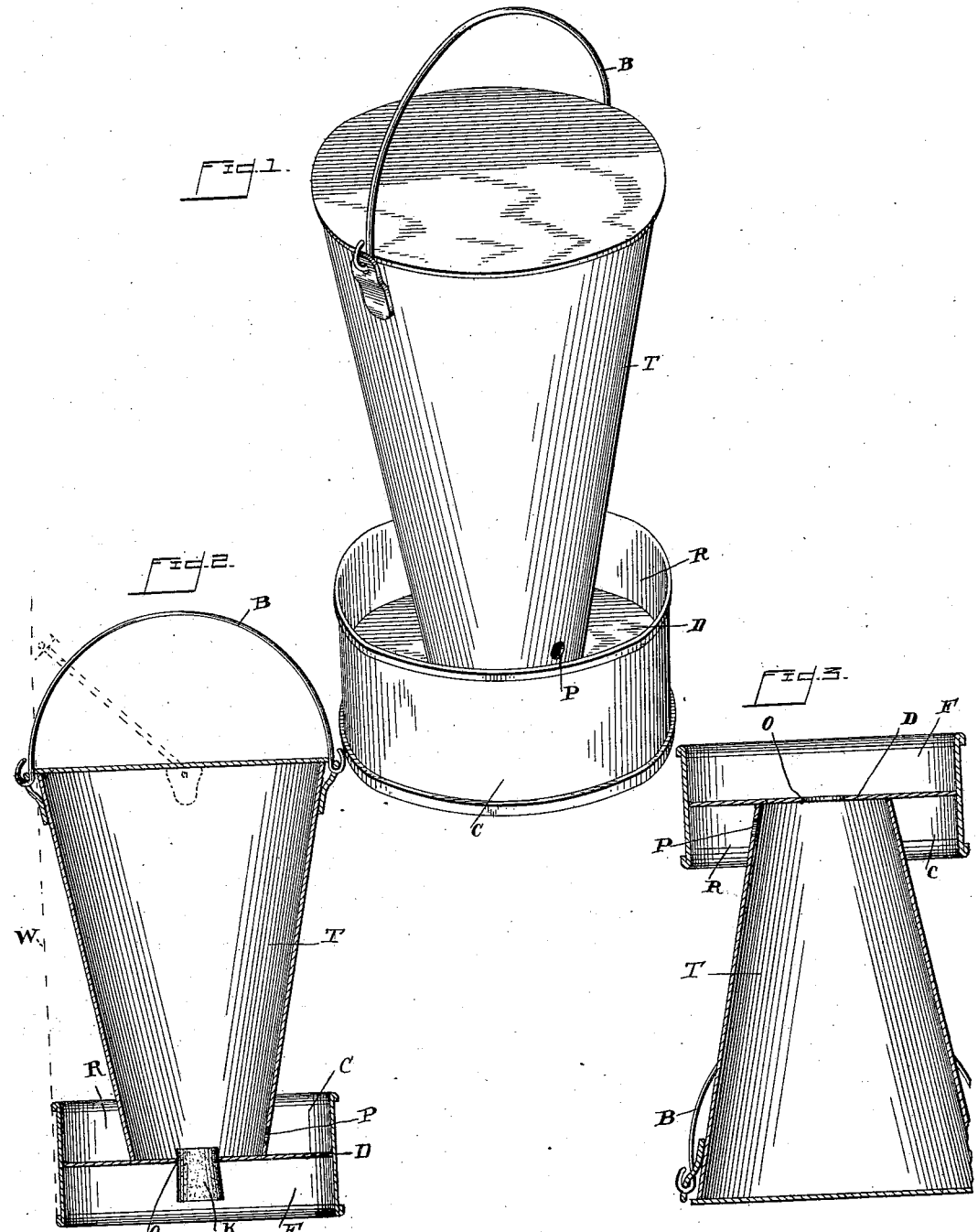
Witnesses
Chas. G. Ford.
R. M. Dayton.
Inventor
Samuel J. Day.
By his Attorneys,
C. A. Snow & Co.

UNITED STATES PATENT OFFICE.

SAMUEL J. DAY, OF BURDEN, KANSAS.

TROUGH FOR POULTRY.

SPECIFICATION forming part of Letters Patent No. 466,397, dated January 5, 1892.

Application filed April 11, 1891. Serial No. 388,517. (No model.)

*To all whom it may concern:*

Be it known that I, SAMUEL J. DAY, a citizen of the United States, residing at Burden, in the county of Cowley and State of Kansas, have invented a new and useful Trough for Poultry, of which the following is a specification.

This invention relates to the care of live stock, and more especially of fowls, and its object is to provide an improved trough for watering the same.

To this end the invention consists of the details of construction hereinafter more fully described, and as illustrated on the sheet of drawings, wherein—

Figure 1 is a general perspective view of this device in use. Fig. 2 is a central vertical section of the same. Fig. 3 is a similar section of the device inverted as is necessary in the act of filling.

Referring to the said drawings, the letter T designates a tank, preferably made in the form of an inverted truncated cone, the top being closed and the bottom having a disk D, also closing it and extending radially some distance beyond the sides thereof, being preferably of about the same diameter as the closed top of the tank. Around the edge of this disk is secured a collar C, which projects above and below the edge of the disk, thereby forming a receptacle R for the water to be fed to the stock, as well as a filling-receptacle F. The tank T is provided with a number of holes or perforations P near its lower end above the disk D and below the level of the upper edge of the collar C. The disk is provided with a filling-orifice O, normally closed by a cork K or some other suitable means. A bail B may be provided by means of which the device can be carried from place to place, or it can be hung up by such bail or by a hook. (Not shown.) The whole is of tin or sheet metal, and the size and proportions of parts will be determined by the use to which it is to be put.

In operation the device is inverted, as seen in Fig. 3, the cork K removed, and the receptacle F filled or partially filled with water or other liquid desired, the stream of water passing thence through the orifice O down into the tank T and past the holes P, and the displaced air in the tank passing out these holes. The cork is then inserted and the device inverted to its proper position, as seen in Figs. 1 and 2, and the water within the tank T flows out of the holes P and rises in the receptacle R until it stands above the level of such holes. At this time there will be no inlet for the air which takes the place of the water as it passes out, and consequently such passage will cease. The stock or fowls are then brought to the device, or it may be hung up and birds will fly to it, and the drinking is done from the receptacle R in an obvious manner. The fact that the disk D is approximately of the same size as the top of the tank T causes the device to stand vertical when suspended by its bail B against a vertical wall W, as seen in dotted lines in Fig. 2. As soon as sufficient water has been removed from the receptacle R to cause the water-level therein to again fall below the holes P, the air passes in and more water flows out to take the place of that consumed, all as will be clearly understood.

In cold weather, if the water should freeze, the device can be carried to a stove, inverted as seen in Fig. 3, and heated, when the water will thaw, the taper of the tank preventing bursting as the thawing water swells.

The device can be painted, japanned, or otherwise ornamented, and considerable change may be made in the details of construction without necessarily departing from the spirit of my invention.

I claim as the salient features of this invention—

The herein-described watering-trough, the same comprising a tank T in the form of an inverted truncated cone whose upper end is permanently closed, a bail on said tank, a flat disk D across the lower end thereof provided with a filling-orifice opening into the tank, the disk being approximately of the same diameter as the top of the tank, and a vertical collar C, secured around the edge of said disk extending above and below the same and forming a drinking-receptacle R above and a filling-receptacle F below said disk, the sides of the tank being provided with holes P above the disk but below the upper edge of said collar, the whole operating and adapted for use substantially as hereinbefore set forth.

In testimony that I claim the foregoing as my own I have hereto affixed my signature in presence of two witnesses.

SAMUEL J. DAY.

Witnesses:
   D. B. CUNNINGHAM,
   MATTHEW CUNNINGHAM.